Figure 1:
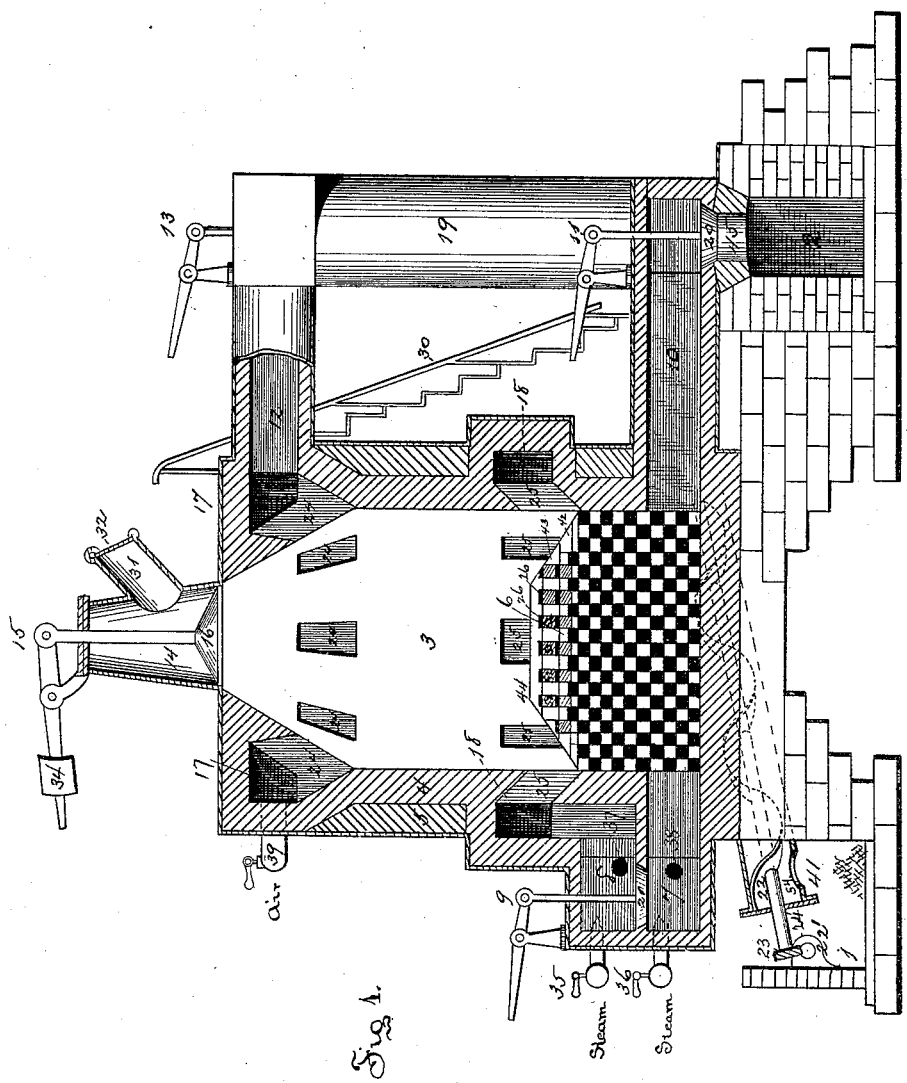

(No Model.) 6 Sheets—Sheet 1.

J. W. CULMER.
GAS PRODUCER.

No. 437,098. Patented Sept. 23, 1890.

(No Model.) 6 Sheets—Sheet 2.

J. W. CULMER.
GAS PRODUCER.

No. 437,098. Patented Sept. 23, 1890.

Witnesses
Philip F. Larner.
Howell Cartle.

Inventor
John Woodruff Culmer
By his Attorneys
Johnson & Johnson (No Model.) 6 Sheets—Sheet 3.
J. W. CULMER.
GAS PRODUCER.
No. 437,098. Patented Sept. 23, 1890.
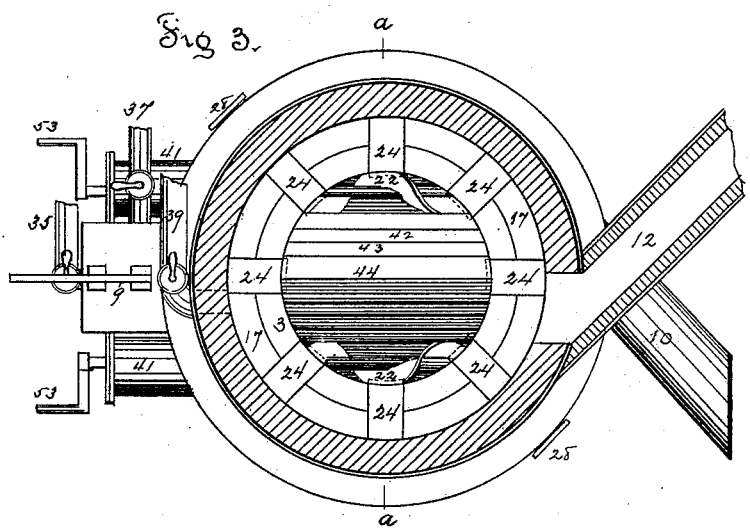
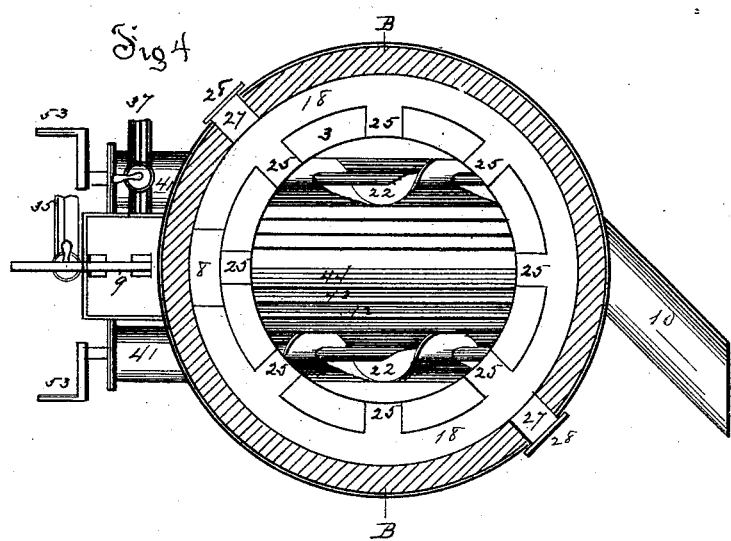

(No Model.) 6 Sheets—Sheet 4.
J. W. CULMER.
GAS PRODUCER.
No. 437,098. Patented Sept. 23, 1890.
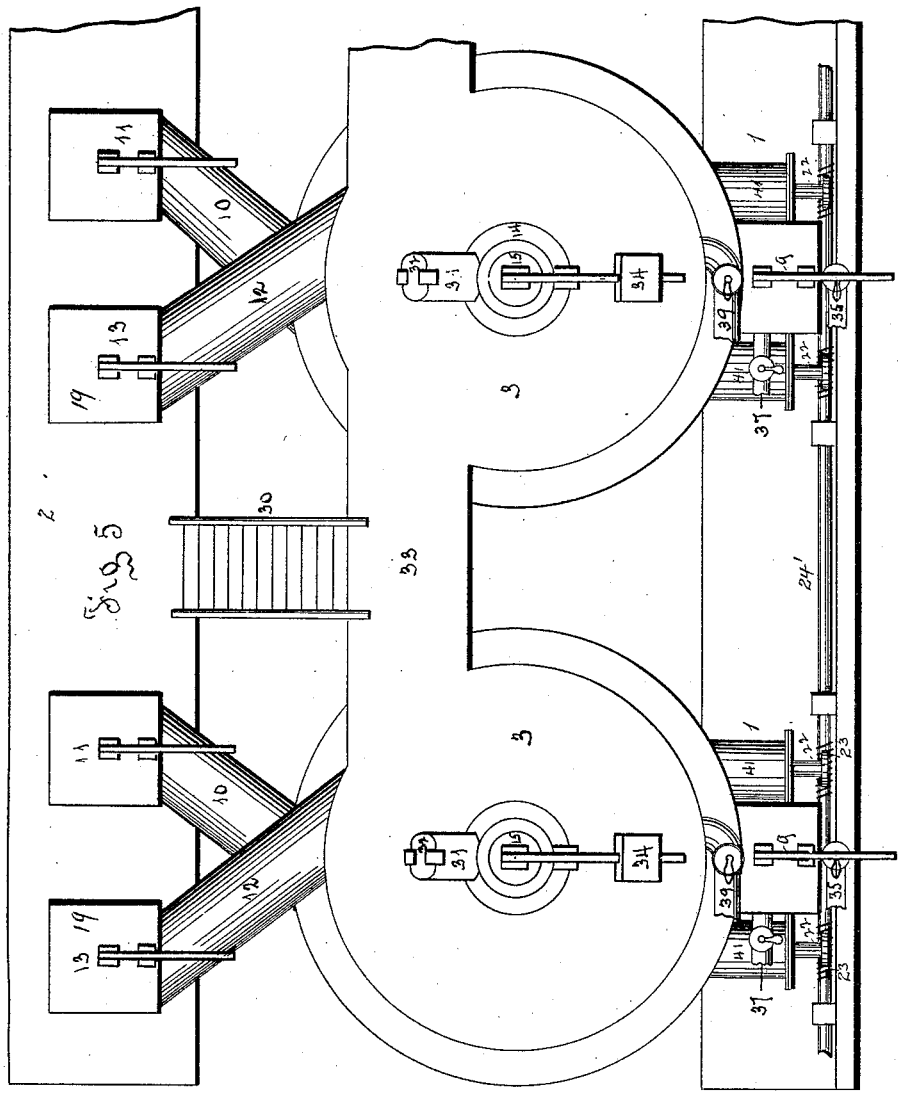
WITNESSES
Philip F. Larner.
Howell Bartle.
INVENTOR
John Woodruff Culmer
By Johnson & Johnson
his Attorneys.

(No Model.) 6 Sheets—Sheet 5.
J. W. CULMER.
GAS PRODUCER.
No. 437,098. Patented Sept. 23, 1890.
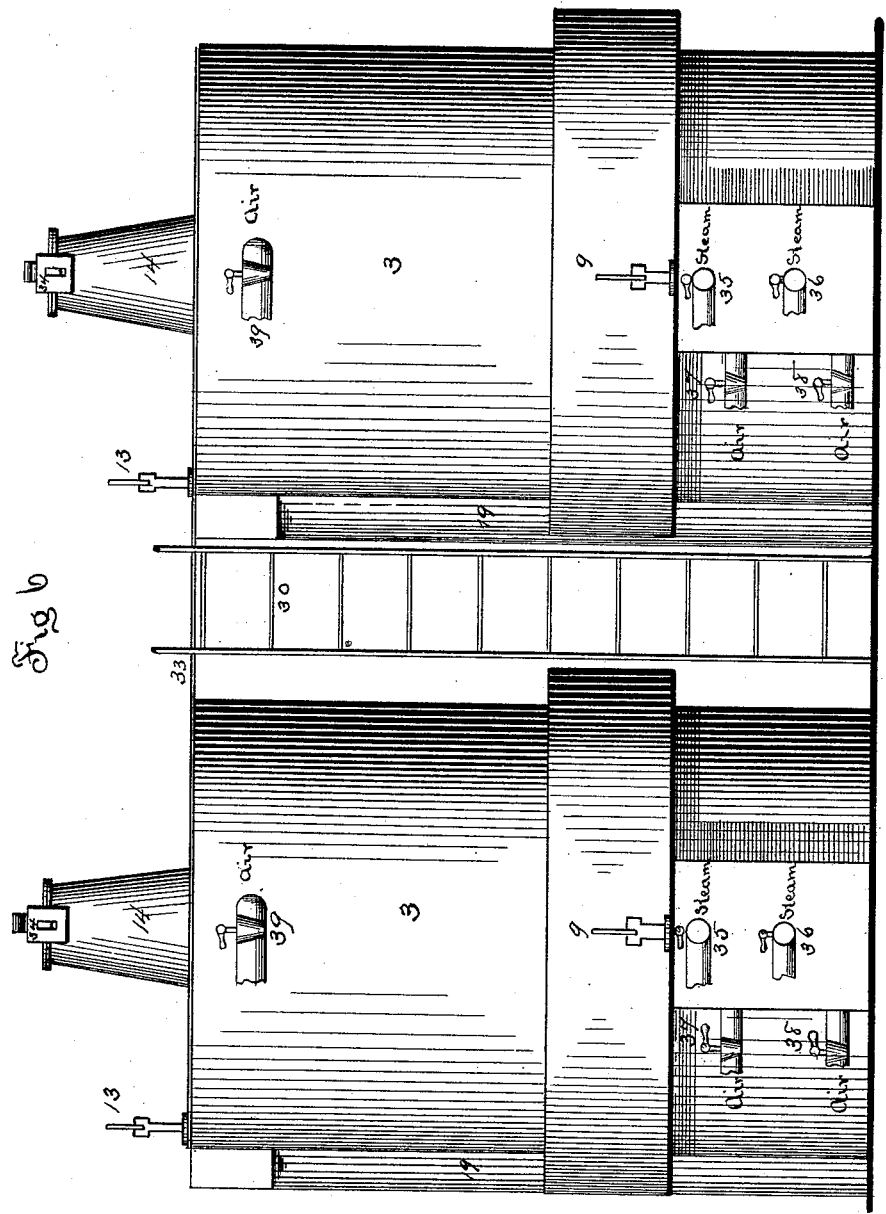

(No Model.)  6 Sheets—Sheet 6.

J. W. CULMER.
GAS PRODUCER.

No. 437,098.  Patented Sept. 23, 1890.

WITNESSES:
Philip F. Larner,
Norwell Bartl.

INVENTOR
John Woodruff Culmer
BY
Johnson & Johnson
his ATTORNEYS.

UNITED STATES PATENT OFFICE.

JOHN W. CULMER, OF NEW BRIGHTON, PENNSYLVANIA.

GAS-PRODUCER.

SPECIFICATION forming part of Letters Patent No. 437,098, dated September 23, 1890.

Application filed January 21, 1890. Serial No. 337,669. (No model.)

*To all whom it may concern:*

Be it known that I, JOHN WOODRUFF CULMER, a citizen of the United States, residing at New Brighton, in the county of Beaver and State of Pennsylvania, have invented new and useful Improvements in Gas-Producers, of which the following is a specification.

My invention is directed to the improvement of generators for the production of fuel-gas; and the objects of my improvements are to provide a construction of fuel-containing chamber wherein valve-controlled passages have such relation to the chamber and to the fuel-bed therein as to effect the indraft of air or steam, or both, or the outdraft of the gaseous products in such a manner that the fuel may be subjected to an updraft or to a downdraft, either continuously or alternately, for the purpose of effecting greater economy in the production of gas, both as to increased volume and as to its heat-producing character. In this operation provision is made for heating or superheating the blast of air or steam, or both, in the passage into and through the fuel-bed and for breaking up or dividing the gaseous products and bringing them into intimate contact with highly-heated refractory surfaces in their exit in the downdraft, thereby "fixing" the more easily-condensible hydrocarbon constituents of the gas. In effecting such operation my invention embraces the organization of a furnace in which a refractory body of checker-work is so arranged that the flue-spaces are in indirect communication with each other and in direct communication with the inlet and the outlet and constitute a portion or continuation thereof, whereby the said body becomes the inlet-passage in the updraft and the heat within the inclosed flue-spaces is thereby utilized with the greatest economy for the heating of an inflowing blast of air or steam, or both, while the said checker-work body forms an outlet-passage in the downdraft, so that the gaseous products are by this means broken up and brought in contact with the highly-heated walls in their passage from said chamber. In this provision of the checker-work regenerator directly within the fuel-containing chamber and in direct continuation on one side with one of its inlet-flues and on its other side with one of its outlet-flues the air or steam, or both, are passed through a continuously-increased heat through such checker-work to the point of their admission into the fuel-bed and are received therein at a point so highly heated that no loss of heat is occasioned within the fuel-bed, the result of which is a more rapid action, higher temperature of the products, and lesser production of carbonic-acid gas.

My improvements also embrace a mechanical process in which an up or a down draft is produced continuously or alternately by the manipulation of valve-controlled inlet and outlet passages through the same hot zone of the fuel-bed and through the same superheating or fixing checker-work body, whereby the different character of distillation or combustion, or both, going on in the different layers of fuel in and near the hot zone of the generating-chamber are more uniformly produced.

My improvement also provides for a dry-sealing of the ash-pits with a perpetually-open discharge.

My improvements also embrace matters of construction and of combination, which I will now describe in connection with the accompanying drawings, and in which—

Figure 2:
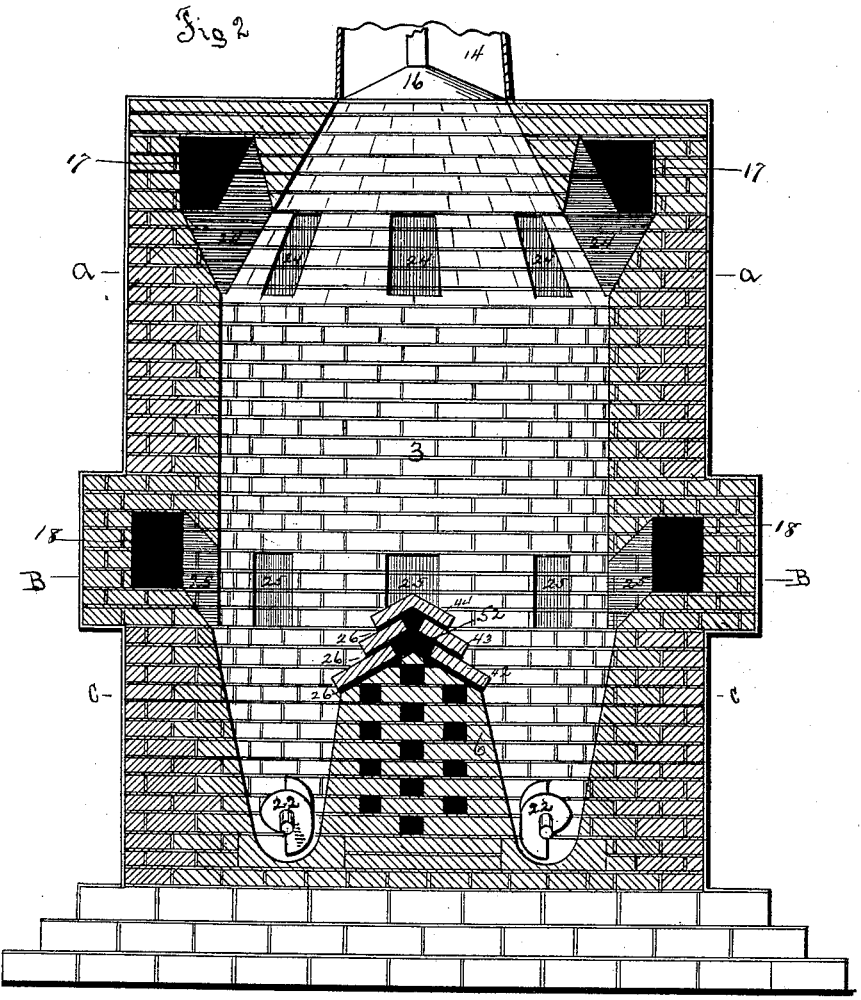
Figure 7:
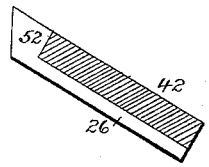
Figure 8:
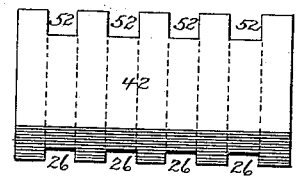
Figure 9:
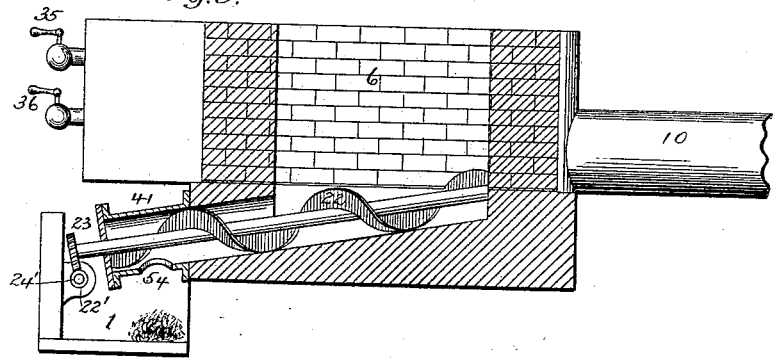

Figure 1 is a vertical section of a generator for fuel-gas embodying my invention. Fig. 2 is a vertical section of the same, taken at right angles to Fig. 1. Fig. 3 is a horizontal section of the same, taken on the line $a\ a$ of Fig. 2. Fig. 4 is a horizontal section of the same, taken on the line B B of Fig. 2. Fig. 5 is a plan view of a pair of such generators. Fig. 6 is a front elevation of the same. Fig. 7 is a section, and Fig. 8 is a side view, of one of the top tile-slabs of the central division; and Fig. 9 is a vertical section of so much of the fuel-containing chamber as shows the relation thereto of the screw ash-conveyer.

The generator is constructed of brick within an iron casing and a lining or inner wall of refractory brick or tile adapted to the construction of the fuel-containing chamber 3. The generator is of circular horizontal section and is provided at the front side with the ash-pit 1 and at the rear side with the service-flue 2. In the bottom of the fuel-containing chamber I erect a division 6, rising to a point about one-third of the height of the fuel-containing chamber, and preferably tapering from its base to its top and extending across the chamber from front to back. It is constructed of refractory brick with interior solids and spaces resembling "checker-work," and these spaces are disposed in such manner as to communicate with each other, with a passage 7 at the front side and with a passage 10 on the rear side of the generator, and with the said chamber 3. The top of this refractory incandescent division structure is constructed with tiles which are of less width with each successive layer or course toward the top and has the form of what is known as the "hip-roof." The under surface of the tiles 42 43 44 are formed with channels 26, which run crosswise of the slabs and terminate at the ridge of the slab in the through-openings 52, making free passages at the ridge extending from the under side of the top tile to the bottom tile, which communicate with openings in the checker-work for the purpose of permitting the gases from the said chamber to enter the lower open ends of the channels and pass down through the flue-spaces in the checker-work and out through the outer passage 10 when this passage is open. In the reversal of this operation, the passage 10 being closed, the steam or air en- entering the passage 7 is permitted to pass up through the checker-work openings and out through the channels 26 into the said chamber, and in this way the checker-work forms a regenerator. In Figs. 7 and 8 I have shown one of the setile-slabs and the channels and edge openings therein, and in erecting the checker-work the crown is covered with a layer or course of these slabs, so that the channels at the lower edges of the slabs open at the top edges of the side walls, while in each superposed layer of slabs the channels open at the top surface of the supporting-slab, the uppermost slab forming a cover for the openings 52 at the ridge-joining edges of the slabs. This construction of the division structure, while forming a regenerator in the process of producing fuel-gas, also serves the important purpose of acting as a wedge to divide the fuel as it is burned and to direct the ashes and cinders from the fuel-bed into discharge gutters or troughs, which open at the outer wall of the generator into the ash-pit. In this function of dividing and shedding the ashes and cinders the outer ends of the tile-channels 26 are covered and kept free from choking with breeze or fine ashes by the overhanging top edges of the slabs, caused by their downwardly-inclined arrangement, as seen in Fig. 2.

At a point within the walls of the generator and about coincident horizontally with the top of the checker-work an annular passage 18 is constructed, surrounding the fuel-containing chamber and connected with it by downwardly-inclined openings 25, placed at suitable distances apart. At the side of the generator over the ash-pit are constructed the passages 7 and 8, one above the other, the lower one 7 communicating with the checker-work openings and the upper one 8 communicating with the annular passage 18. These passages are caused to communicate with each other by a suitable valve 21, through which, when opened and the outlet-flue valve 20 closed by its lever 11, blasts of air or steam, or both, may be passed through the checker-work and at the same time through the annular passage into the fuel-containing chamber.

At and within the wall of the upper portion of the generator an annular passage 17 is constructed and communicates with the interior of the said chamber by downwardly-inclined openings 24, placed at suitable distances apart. The bottom outlet-passage 10 of the checker-work communicates with the outlet-flue 2 by the opening 45, controlled by the valve 20, while the annular passage 17 communicates with the top outlet-passage 12, and the latter communicates with the outlet-flue 2 by the downtake 19, which is controlled by the top-valve having a hand-lever 13, so that the operation of the furnace can be carried on alternately through either of these outlet-flues. The annular passage 18 is provided with the outer-wall openings 27 27, Fig. 4, fitted with covers 28 for examination of the fuel and for the introduction of tools for preventing bridging of the fuel or formation of clinkers within the fuel-containing chamber. That portion of the said chamber which is on a level with the top of the checker-work and in the plane of the incandescent portion of the fuel is the "hot zone," and within or upon that zone only is steam introduced through the annular wall-passage 18. That portion of the said chamber above the incandescent portion of the fuel is by comparison the "cold zone," and is utilized only for the air-blast in the downdraft portion of the process of producing fuel-gas. At any convenient point, but preferably at the front side of the generator-wall, is fitted an air-supply pipe 39, by which air is supplied to the top annular passage 17, while an air-supply pipe 38 is fitted on the outer-wall projection of the passage 7 to supply air thereto for the checker-work. A similar air-supply pipe 37 connects with the passage 8 for supplying air to the annular passage 18, while pipes 35 and 36 are provided for supplying steam to the checker-work openings and to said annular passage 18. These pipes are provided with suitable valves for regulating and controlling the supply of air and steam.

The upper portion of the fuel-containing chamber is drawn in conical form from a point about on a line with the lower edges of the openings 24 of the upper annular passage 17 to the top of said chamber, the opening wherein is closed by a charging-valve 16, which is inclosed by a vertical case 14, which forms a tight charging-chamber having a side charging-chute 31, fitted with a gas-tight cover 32. The charging-valve is maintained in closed position by a weighted lever 15.

The gutters or troughs on each side of the checker-work division are formed with curved bottoms, and are preferably inclined downward toward the ash-pit and terminate in outside cylindrical cases 41, which are closed at their outer ends, and each is provided with a discharge-opening 54 at its lower side, through which the ashes are delivered into the ash-pit. Within these gutters or troughs a screw-conveyer 22 is fitted to revolve in bearings in the chamber-wall and in the outer closed end of the cylindrical case. The shafts of these screw conveyers are provided with worm-gear $22^3$ and are operated by worm-gear 22' on a shaft 24', suitably supported in the wall of the ash-pit, and which may be operated by cranks or otherwise to act rotatively to draw out the ashes and cinders resting upon them between the walls of the central checker-work division and the walls of the fuel-containing chamber, which incline outwardly, and with the inwardly-inclined walls of the central division form V-shaped ash-collecting chambers, into which the dividing action of the central checker-work directs the ashes.

I prefer to construct these generators in pairs, and in such case they are provided with the bridge 33 and step 30 for the convenience of the operatives.

Having described the construction, I will now describe the operation of the generator and the process of producing fuel-gas.

The magazine being constructed, the screw conveyers 22 22 are covered with ashes to about a point indicated by the line C C, Fig. 2. Fire is lighted upon this bed of ashes, the magazine is charged with fuel, air is turned on at the valve 38 of the passage 7, the valve 13 of the downtake is opened, and all other valves are closed. The carbonic oxide from the combustion passes out through the openings 24 24 and the passages 17 12 and through the downtake 19 into the flue 2, by which it is led to the point of consumption. The zone surrounding the fuel under combustion becomes highly heated, the air-valve 38 is closed, and the steam-valve 36 opened, whereupon steam passes through the passage 7 and through the checker-work 6 and out through the tile-channels 26 26, becoming superheated in such passage, thence through the incandescent fuel, becoming dissociated thereby, and passes out through the downtake 19 to the point of consumption. The incandescent fuel is quickly depleted of its heat, the valve 13 is closed, and the valve 20 opened. The steam-valve 36 is closed and the air-valve 39 opened, and the magazine becomes a downdraft producer. The incandescent-fuel bed is regenerated and the checker-work 6 reheated. The air-valve 39 is then closed and the steam-valve 35 opened, and the dissociated gas passes out through the lower passage 10 into the flue 2 and to the point of consumption. The screws 22 may be rotated by hand from to time for the removal of the ashes, or they may be kept in continuous slow rotation by mechanical means. The charging is accomplished in the ordinary way through the chamber 14 by the valve 16, and the fuel-bed should be maintained at a point about halfway between the top of the openings 25 25 and the bottom of the openings 24 24.

I prefer to use air from a reservoir or blast having a constant pressure of three inches, (water,) and the steam of any pressure is controlled by the operative, so that in its expansion the pressure is about that of the air.

By operating the magazines in pairs there will be carbonic oxide or ordinary producer-gas passing from one into the flue 2, while from the other there will be furnished dissociated hydrogen, or a gas rich in hydrogen, to mingle with that from the first magazine. The reversal of the action makes no change in the character of the gas as a whole, and the result is a gas of an even quality or character.

The use of air under a fixed pressure gives great speed and certainty of results in quantity and quality. Great heat is imparted to the hot zone of the magazine and to the checker-work 6, and consequently a large volume of steam may be dissociated and utilized.

The use of the downdraft regenerates the incandescent-fuel bed, breaks up and gasifies a large percentage of the hydrocarbon and tarry products of distillation in that part of the fuel between the incandescent and the cold layers, and superheats the checker-work.

While I prefer to construct the generators in pairs and enlarge a plant by the addition of one or more pairs, yet there may be circumstances requiring gas of a particular synthesis or utilizing it under peculiar conditions where a group of three magazines would be preferable.

The term "carbonic-oxide gas" as used herein refers to ordinary producer-gas, in which carbonic oxide is the predominant available heat-producing gas.

The term "dissociated hydrogen gas" used by me refers to a gas in which the hydrogen produced by the dissociation of steam predominates as the available heat-producing gas.

By the regeneration of the incandescent fuel is meant a fact that depends upon the following premises: So long as combustion of carbonaceous fuel is imperfect the product is a carbonic oxide gas, which is available as a heat-producer. As the combustion becomes more nearly perfect there is produced a constantly-increasing proportion of carbonic acid, which is a great detriment to a fuel-gas because it requires a large volume of other gas to maintain its heat, and so occupies space which should be utilized for producing heat in the furnace where the gas is burned.

In the downdraft process the carbonic acid which is being produced in the incandescent fuel is regenerated by the excess of carbon brought down from the upper layers of fuel, and, taking up another portion of carbon, becomes carbonic oxide, which is a useful fuel-gas.

The placing of the checker-work or regenerator body within the chamber so that it joins the inlet-passage on one side of the chamber and the outlet-passage on the other side of said chamber, as shown in Fig. 1, gives the important advantages that when the downdraft action of the generator is produced there is stored up within said chamber a large percentage of heat from the gaseous products through said body, and that such products are by contact with the hot walls broken up and "fixed," while when the alternate operation is produced the stored-up heat is given off from such checker-work surfaces to the air or steam, or both, passing through the zigzag flues or spaces of such body to the greater economy in the production of gas.

Referring to the ash-pits, it will be seen that by inclining their bottoms and inclining the ash screw conveyers therein to the points of exit, and by covering that portion of the screw conveyer which extends outside of the chamber with the tubular cap 41, and by providing the latter with a gravity-discharge orifice in its lower side there is obtained a discharge of the ashes from the chamber by the screw conveyer, so that the said bottom orifice is kept closed and sealed from the inflow of the air by means of the ashes, and for this purpose the outer end of the cap must be closed and the screw conveyer should extend over the discharge-orifice. This construction gives the advantage of a perpetually-open discharge with a dry seal for the ashes from the generating-chamber, so that no air can enter the latter through the body of the ashes.

In the operation of the generation of the producer-gas the product of the imperfect combustion going on in the producer is carbonic oxide; but as the combustion is more or less perfect in different parts of the fuel-bed there are carried with the carbonic oxide marsh-gas, olefiant gas, and homologues rich in carbon. If these gases were permitted to come in contact with a cold surface, much of them would condense and become soot, coal-tar, and ammoniacal liquor. Various plans have been proposed to accomplish this result of producing gas of a uniform condition. Among these plans the gaseous products have been passed through heated retorts, through retorts filled with coke, through retorts filled with copper plates or tubes, through retorts filled with refractory material, and through regenerative or heat-storing chambers, which are nearly filled with loosely-piled refractory material and are separate and distinct from the generating or fuel-containing chamber and heated only by the outflowing gas itself.

I claim—

1. In a generator for the production of fuel-gas, the combination, with a fuel-containing chamber having an upper annular air-supplying wall-passage 17, communicating with said chamber and having a valved gas-outlet downtake opening into the service-pipe, and a lower annular wall-passage 18, having air and steam inlets and communicating with said chamber, of a refractory structure dividing the lower portion of said chamber and having interior checker-work openings or flues communicating at its top with said chamber and having air and steam inlets and an outlet-passage below said top, the latter passage having a valved communication with the service-flue, substantially as described.

2. The combination, with a gas-generating chamber having an upper annular wall-passage 17, communicating by openings 24 with the upper portion of said chamber, and a valve-controlled air-inlet 39 for said passage, of a refractory body dividing the lower portion of said chamber, having top openings 26, communicating with the latter and formed with interior checker-work spaces communicating with each other and with said top openings, and a valve-controlled outlet-passage 10, joining one side of said checker-work body and connecting with its spaces, whereby the gas is produced directly within said chamber and within the checker-work body therein by the direct downdraft through the fuel-bed.

3. The combination, with a gas-generating chamber having an upper annular valve-controlled outlet wall-passage 17 for the products of combustion, communicating by openings 24 with the upper portion of said chamber, of a refractory body dividing the lower portion of said chamber, having top openings 26, communicating with the latter, and formed with interior checker-work spaces communicating with each other and with said top openings, and a valve-controlled inlet-passage 7 for air and steam, joining one side of said checker-work body and connecting with its spaces, whereby the gas is produced directly within said chamber by the updraft through said checker-work body into and through the fuel-bed.

4. The combination, with a gas-generating chamber having an annular wall-passage 17 in its upper portion, provided with a valve-controlled air-inlet 39 and a valve-controlled outlet-passage 12 for the gaseous products and opening into said chamber, and a lower annular wall-passage 18, opening into said chamber by the passage 25 and having valve-controlled air and steam inlets 8 35, of a refractory body dividing the lower portion of said chamber, having top openings 26, communicating with the latter and formed with interior checker-work spaces communicating with each other and with said top openings, and a valve-controlled outlet-passage 10 for the gaseous products, joining one side of said checker-work body and connecting with its spaces, whereby gas is produced by the up and by the down draft in the way described.

5. The combination, with a gas-generating chamber having suitable valve-controlled inlets for air or steam, or both, and a valve-controlled outlet for the gaseous products, of a refractory body dividing the lower portion of said chamber, having top openings 26, communicating with the latter and formed with checker-work spaces communicating with each other and with said top openings, a valve-controlled bottom inlet-passage 7, joining the said checker-work spaces on one side of said body, and a valve-controlled bottom outlet-passage 10, joining the said checker-work spaces on the other side of said body, substantially as described.

6. The combination, with a gas-generating chamber having a suitable inlet and an outlet, of a refractory body or structure of a wedge shape in cross-section, extending from and joining the two opposite walls to divide the bottom of said chamber into separate and distinct ash-pits, formed with interior checker-work openings, and provided with capping-tiles 42, having under channels or grooves 26, opening into said separate ash-pits and into said interior checker-work, and an inlet and an outlet passage in the bottom of said chamber in direct communication with the two open sides of said checker-work, substantially as described, for the purpose specified.

7. In combination, in a fuel-gas generator, the fuel-containing chamber having an upper annular passage 17, communicating with said chamber, an air-inlet valve 39 for said passage, and a valved outlet 12 for the same, and a lower annular wall-passage 18, having air and steam inlets 37 and 35, a refractory structure in the bottom of said chamber, having checker-work openings communicating at its top with said chamber, a passage 7, communicating with said checker-work openings and having air and steam inlets 38 and 36, a valve-controlled outlet-passage 10, leading from said structure, a service-flue 2, and a downtake 19, connecting the top outlet-passage 12 with said service-flue, substantially as described.

8. In combination with a gas-generating chamber having a suitable inlet for air or steam, or both, and an outlet for gaseous products, a refractory body or structure extending from and joining two opposite sides of the chamber-walls to divide said chamber into separate and distinct ash-pits and having interior checker-work spaces opening at two of its sides and into top channels 26, which open at top of said ash-pits, and a screw conveyer 22, arranged within and between the closed refractory walls of said ash-pits above the discharge therefrom, the said checker-work having valve-controlled communication with the inlet and the outlet, substantially as described.

9. In combination with a gas-generating chamber, a refractory body or structure arranged to divide the bottom of said chamber and having interior checker-work spaces opening into top-covered channels 26, communicating with said chamber, an annular passage 18, surrounding and opening into said chamber on a level with said checker-work body and having air and steam inlets 8 35, and a gas-outlet 10, connecting the said checker-work spaces with the service-flue, substantially as described.

10. In combination with a gas-generating chamber having a suitable inlet for air and gas, or both, and an outlet for gaseous products, a refractory body or structure extending from and joining two opposite sides of the chamber to divide it into two separate and distinct ash-pits having downwardly-inclined bottoms and having interior checker-work spaces opening into top channels 26, which open at the top of said ash-pits, an inclined screw conveyer arranged within and between the closed refractory walls of said ash-pits, and a tubular cap having a closed outer end and a bottom discharge-opening 54, whereby the ash-pit is kept sealed from the inflow of air, the said checker-work having valve-controlled communication with the inlet and the outlet, substantially as described.

11. In combination with a gas-generating chamber having an inlet for air or gas, or both, and an outlet for gaseous products, a refractory body or structure dividing the bottom of said chamber, having inclosed communicating spaces formed by checker-work, capped with tile 42, arranged in successive layers or courses to the top and of decreasing width, each tile having channels 26 on its under side running crosswise, opening into said chamber at their lower edges, and communicating at the ridge edge of the slab by openings 52 with the said checker-work spaces, substantially as described.

In testimony whereof I have hereunto set my hand in the presence of two subscribing witnesses.

JNO. W. CULMER.

Witnesses:
A. E. H. JOHNSON,
E. M. DAWSON.